(12) United States Patent
Wang et al.

(10) Patent No.: US 9,384,241 B2
(45) Date of Patent: Jul. 5, 2016

(54) RERANKING USING CONFIDENT IMAGE SAMPLES

(75) Inventors: Jingdong Wang, Beijing (CN); Shipeng Li, Beijing (CN); Nobuyuki Morioka, Santa Clara, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 46 days.

(21) Appl. No.: 13/393,509

(22) PCT Filed: Nov. 24, 2011

(86) PCT No.: PCT/CN2011/082843
§ 371 (c)(1),
(2), (4) Date: Feb. 29, 2012

(87) PCT Pub. No.: WO2013/075310
PCT Pub. Date: May 30, 2013

(65) Prior Publication Data
US 2014/0250109 A1 Sep. 4, 2014

(51) Int. Cl.
*G06F 17/30* (2006.01)
(52) U.S. Cl.
CPC ...... *G06F 17/3053* (2013.01); *G06F 17/30247* (2013.01); *G06F 17/30277* (2013.01)
(58) Field of Classification Search
USPC ................................................ 707/766, 722
See application file for complete search history.

(56) References Cited

U.S. PATENT DOCUMENTS

| 8,732,187 | B1* | 5/2014 | Jing et al. ............ 707/766 |
| 2009/0154795 | A1* | 6/2009 | Tan et al. ............ 382/155 |
| 2009/0313239 | A1 | 12/2009 | Wen et al. |
| 2010/0082615 | A1 | 4/2010 | Clinchant et al. |
| 2010/0088295 | A1 | 4/2010 | Duan et al. |
| 2011/0196859 | A1 | 8/2011 | Mei et al. |

FOREIGN PATENT DOCUMENTS

| CN | 101334796 A | 12/2008 |
| CN | 101539930 A | 9/2009 |
| CN | 101777064 A | 7/2010 |

OTHER PUBLICATIONS

Carbonell et al., "Translingual Information Retrieval: A Comparative Evaluation", In Proceedings of the Fifteenth International Joint Conference on Artificial Intelligence, Aug. 23-29, 1997, 7 pages.

(Continued)

*Primary Examiner* — Amresh Singh
(74) *Attorney, Agent, or Firm* — Steve Wight; Sandy Swain; Micky Minhas

(57) ABSTRACT

The techniques described herein determine an initial set of ranked images associated with an image-based search query. Based on visual content similarities between images in the initial set of ranked images, the techniques select confident image samples from the initial set of ranked images. The techniques then use the confident image samples to rerank the initial set of ranked images. Accordingly, a search engine uses the confident image samples to promote images that are likely to be relevant to the search query, while demoting images that are not likely to be relevant to the search query. Therefore, the search engine can provide improved relevance-based search results to an image-based search query.

20 Claims, 6 Drawing Sheets

(56) References Cited

OTHER PUBLICATIONS

Coleman et al., "A Reective Newton Method for Minimizing a Quadratic Function Subject to Bounds on Some of the Variables", SIAM Journal on Optimization, Dec. 7, 1992, 37 pages.

D. Lowe, "Distinctive Image Features from Scale-Invariant Keypoints", International Journal of Computer Vision, Jan. 5, 2004, 28 pages.

Eriksson et al., "Efficient Computation of Robust Low-Rank Matrix Approximations in the Presence of Missing Data Using the L1 Norm", in CVPR, 2010, Jun. 13-18, 2010, 8 pages.

Hsu et al., "Reranking Methods for Visual Search", IEEE Trans. Multimedia, vol. 14, No. 3, published Jul. 2007, 9 pages.

Hsu et al., "Video Search Reranking Via Information Bottleneck Principle", In ACM Multimedia, Oct. 23-27, 2006, 10 pages.

Hsu et al., "Video Search Reranking Through Random Walk over Document-Level Context Graph", In ACM Multimedia, Sep. 23-28, 2007, 10 pages.

Jain et al., "Learning to Re-Rank: Query-Dependent Image Re-Ranking Using Click Data", In International World Wide Web Conference, Mar. 28-Apr. 1, 2011, 10 pages.

Jing et al., "VisualRank: Applying PageRank to Large-Scale Image Search", IEEE Transactions on Pattern Analysis and Machine Intelligence, vol. 30, No. 11, Nov. 2008, 14 pages.

Kim et al., "L1 Trend Altering", SIAM Review, Society for Industrial and Applied Mathematics, vol. 51, No. 2, published May 28, 2008, 22 pages.

Kim et al., "Sparse Non-Negative Matrix Factorization via Alternating Non-Negativity-Constrained Least Squares for Microarray Analysis", College of Computing, Georgia Institute of Technology, received on Nov. 2, 2006, 8 pages.

Krapac et al., "Improving Web-Image Search Results Using Query-Relative Classifiers", Computer Vision and Pattern Recognition (CVPR), Jun. 13-18, 2010, 8 pages.

Lazebnik et al., "Beyond Bags of Features: Spatial Pyramid Matching for Recognizing Natural Scene Categories", Computer Vision and Pattern Recognition, Jun. 2006, 8 pages.

Liu et al., "Learning to Video Search Rerank via Pseudo Preference Feedback", 2008 IEEE International Conference on Multimedia and Expo, Jun. 23, 2008, 4 pages.

Liu et al., "Noise Resistant Graph Ranking for Improved Web Image Search", Computer Vision and Pattern Recognition (CVPR), Jun. 20-25, 2011, 8 pages.

Liu et al., "Optimizing Video Search Reranking via Minimum Incremental Information Loss", In Proceedings of ACM International Workshop on Multimedia Information Retrieval, published Oct. 2008, 7 pages.

Liu et al., "Optimizing Visual Search Reranking via Pairwise Learning", IEEE Transactions on Multimedia, vol. 13, No. 2, published Apr. 2001, 12 pages.

Liu et al., "Typicality-Based Visual Search Reranking", IEEE Transactions on Circuits and Systems for Video Technology, May 2010, 7 pages.

Naphade et al., "A Light Scale Concept Ontology for Multimedia Understanding for TRECVID 2005", IBM Research Division, Computer Science, May 17, 2005, 7 pages.

Natsev et al., "Semantic Concept-Based Query Expansion and Re-reranking for Multimedia Retrieval", In ACM Multimedia, Sep. 23-28, 2007, 10 pages.

Smeulders et al., "Content-Based Image Retrieval at the End of the Early Years", IEEE Transactions on Pattern Analysis and Machine Intelligence, vol. 22, No. 12, Dec. 2000, 32 pages.

Stark et al., "Bounded-Variable Least-Squares: An Algorithm and Applications", Computational Statistics, Jan. 1995, 13 pages.

Stricker et al., "Similarity of Color Images", In SPIE Storage and Retrieval for Image and Video Datasets III, Feb. 1995, 12 page.

Sun et al., "Robust Sparse Rank Learning for Non-Smooth Ranking Measures", In SIGIR, Jul. 19-23, 2009, 8 pages.

Tang et al., "IntentSearch: Capturing User Intention for One-Click Internet Image Search", Journal of Latex Class Files, vol. 6, No. 1, published Jan. 2010, 13 pages.

Tian et al., "Bayesian Visual Reranking", IEEE Transactions on Multimedia, vol. 13, No. 4, Aug. 2011, 14 pages.

Tibshirani et al., "Sparsity and Smoothness via the Fused Lasso", Journal of the Royal Statistics Society Series, Aug. 2004, 18 pages.

Tibshirani et al., "The Solution Path of the Generalized Lasso", The Annals of Statistics, Oct. 21, 2010, 30 pages.

Vedaldi et al., "VLFeat: An Open and Portable Library of Computer Vision Algorithms", Proceedings of the international conference on Multimedia, Oct. 25-29, 2010, 4 pages.

Wang et al., "MSRA-MM: Bridging Research and Industrial Societies for Multimedia Information Retrieval", Microsoft Research, published Mar. 16, 2009, 14 pages.

Yan et al., "Co-Retrieval: A Boosted Reranking Approach for Video Retrieval", Image and Signal Processing, Dec. 9, 2005, 14 pages.

Yan et al., "Multimedia Search with Pseudo-Relevance Feedback", International Conference on Image and Video Retrieval, Jul. 24-25, 2003, 10 pages.

Zhou et al., "Latent Visual Context Analysis for Image Re-Ranking", Microsoft Research Asia, CIVR' 10, Jul. 5-7, 2010, 8 pages.

Zou, "The Adaptive Lasso and Its Oracle Properties", Journal of the American Statistical Association, vol. 101, issue 476, Dec. 2006, 12 pages.

PCT International Search Report and Written Opinion for PCT Application No. PCT/CN11/82843 mailed on Aug. 9, 2012, 7 pages.

* cited by examiner

RERANKING USING CONFIDENT IMAGE SAMPLES

PRIORITY APPLICATION

This Application is a 35 U.S.C. 371 National Stage Entry of and claims priority from PCT Application Serial No. PCT/CN2011/082843, titled "RERANKING USING CONFIDENT IMAGE SAMPLES", filed on Nov. 24, 2011, the entire contents of which are incorporated herein by reference.

BACKGROUND

As the number of images available online continues to expand, image-based search engine mechanisms continue to pursue improved techniques that return the most relevant images in response to receiving a search query. Typically, search engines initially rely on matching textual information associated with an image (e.g., image titles, image captions, URLs, etc.) to the textual elements (e.g., keywords) provided in the search query. The initial textual matching identifies candidate images for the search query and ranks the identified candidate images according to a relevance score based on the textual matching.

However, the textual information fails to capture and/or consider the visual content of an image. Therefore, textual-based relevance ratings are susceptible to errors because the textual information associated with images often does not provide reliable image-based results to a search query.

SUMMARY

The techniques described herein determine an initial set of ranked images associated with an image-based search query. Based on visual content similarities between images in the initial set of ranked images, the techniques select confident image samples from the initial set of ranked images. The techniques then use the confident image samples to visually rerank the initial set of ranked images. Accordingly, a search engine uses the confident image samples to promote images that are likely to be relevant to the search query, while demoting images that are not likely to be relevant to the search query. Therefore, the search engine can provide improved relevance-based search results to an image-based search query.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, and/or arrangement(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

Overview

The following description sets forth techniques for visually reranking a set of images in response to receiving an image-based search query. The techniques discussed herein determine and select confident samples from an initial list of images ranked according to textual information. The techniques then use the confident samples to rerank the initial list of images so that images more likely to be relevant to the image-based search query are ranked higher, while images more likely to be irrelevant to the image-based search query are ranked lower.

As discussed herein, the techniques determine a small number of confident image samples. For instance, hundreds or thousands of images may be identified for the initial list of images in response to receiving the image-based search query. Accordingly, the techniques seek to select a number of confident image samples from the initial list of images. For example, the number may be two, three, five, ten, or twenty.

Figure 1:
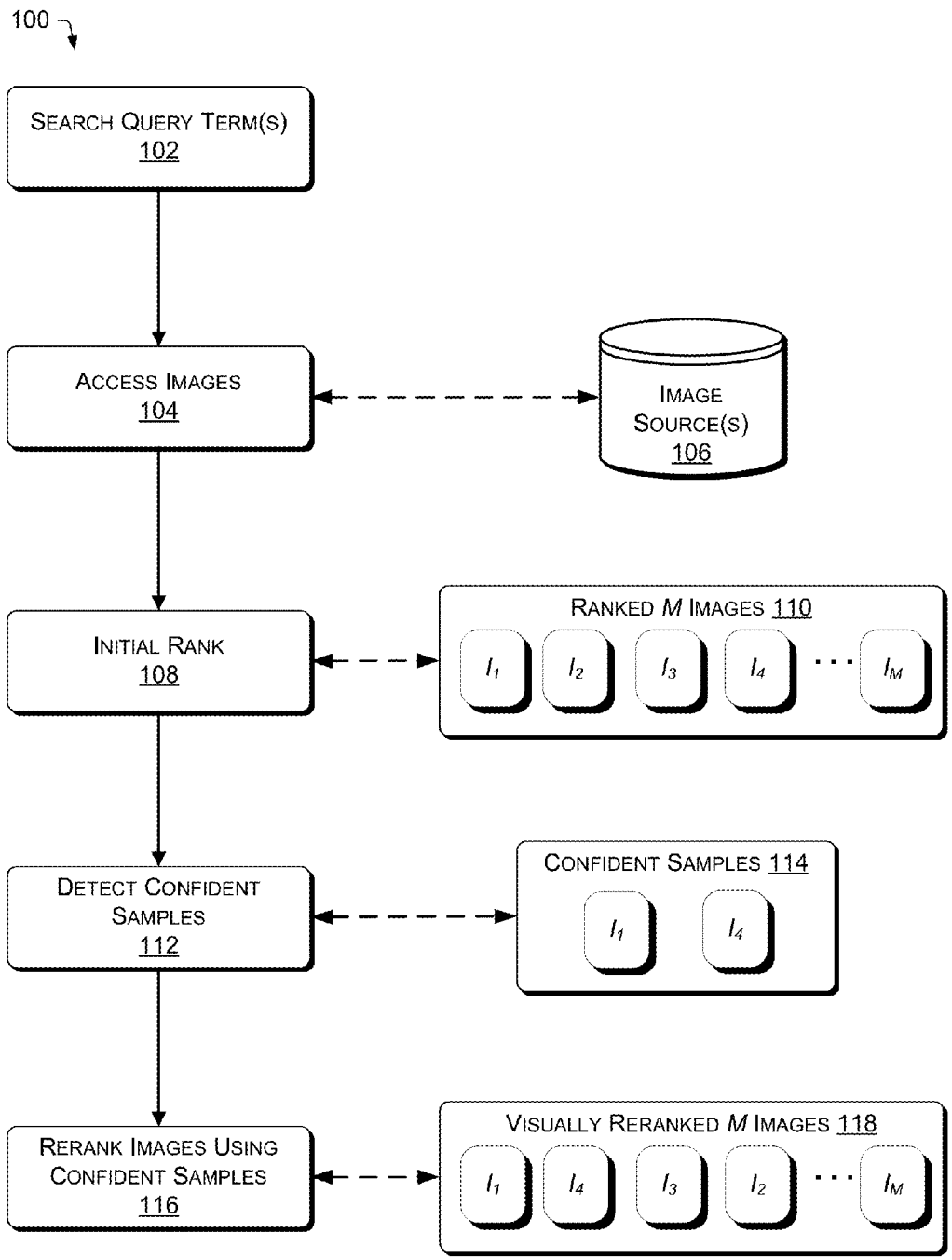
FIG. 1 illustrates an example overview that visually reranks images, in accordance with various embodiments described herein.

FIG. 1 illustrates an example overview of the techniques that select confident image samples from an initial list of ranked images. For the purpose of this document, image-based search and retrieval is discussed using the term "images". However, it is understood in the context of this document that an image may correspond to static images, videos, photos, documents, or any type of electronic information with visual content features that can be analyzed and/or extracted. Thus, the term "images", as used in this document, encompasses multiple different types of electronically available visual information. At 102, the techniques receive an image-based search query with one or more textual query terms. At 104, the techniques use the image-based search query terms to identify and access a plurality of different images from multiple different image sources 106. The plurality of different images are a set of M images, each image including and/or having textual information that is associated with or matched to the image-based search query terms in some degree.

At 108, the techniques rank the set of M images according to a relevance score based on textual matching thereby providing an initial ranked set of M images 110. In various embodiments, the techniques perform the functionality depicted by blocks 104 and 108 concurrently.

At 112, the techniques detect and select one or more confident image samples 114 from the initial ranked set of M images 110. At 116, the techniques rerank the initial ranked set of M images 110 based on a degree of visual content similarity between the respective images in the initial ranked set of M images 110 and the selected confident image samples 114. A search engine can then provide the visually reranked set of M images 118 is response to the search query received at 102.

The confident image selection illustrated in FIG. 1 is based on an observation that a group of images that are most likely to be relevant to an image-based search query will share different visual content features and/or patterns with one another more often than images that are not relevant to the search query (e.g., irrelevant or outlier images). In other words, a group of relevant images tends to be more similar and less diverse, compared to a group of various irrelevant images, which tend to be dissimilar and more diverse. Accordingly, a relevant image most likely has a high degree of visual content similarity to another relevant image, while an irrelevant image most likely has a low degree of visual content similarity to both relevant images and also other irrelevant images (e.g., by virtue of being a diverse group of outlier images).

Figure 2:
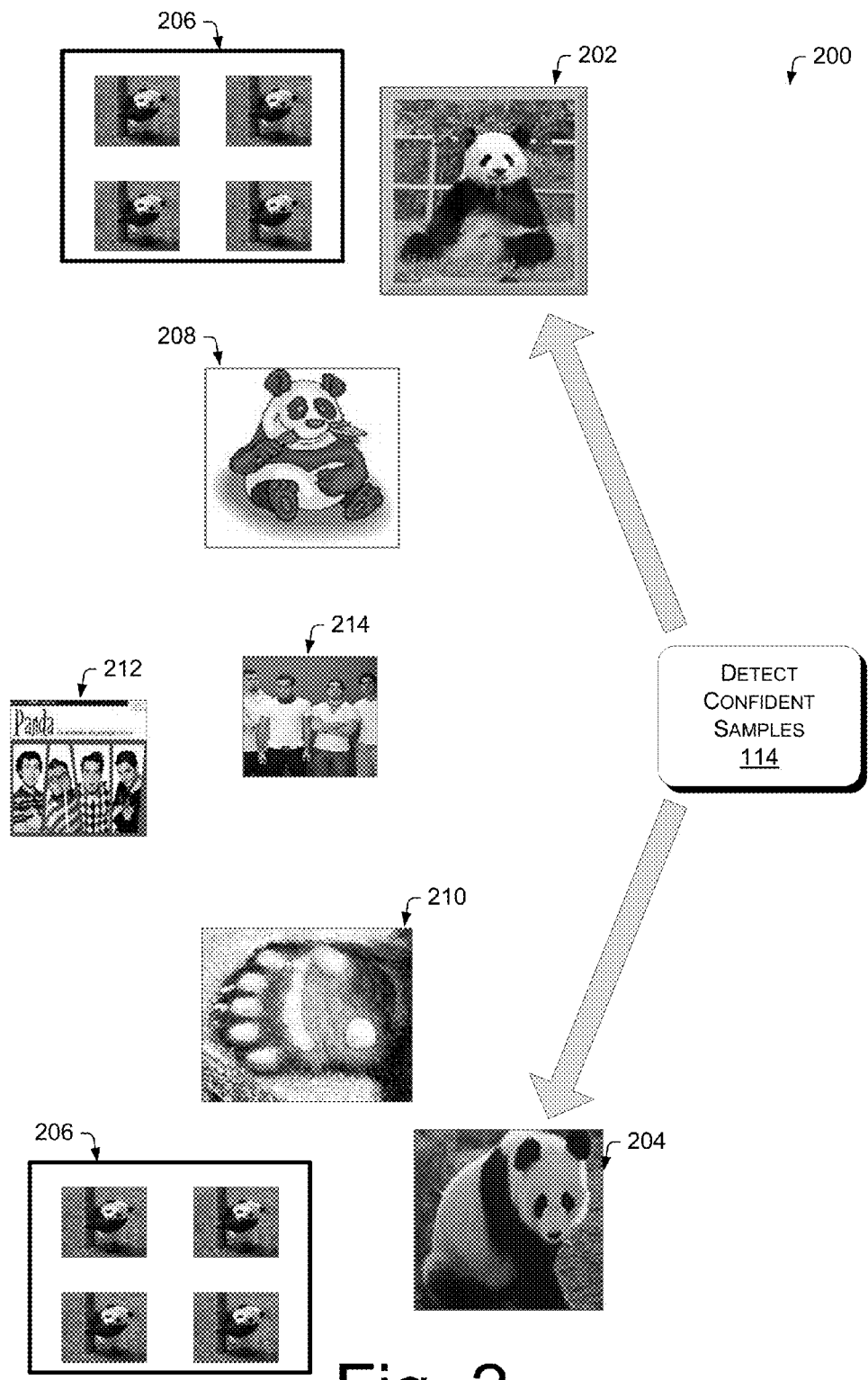
FIG. 2 illustrates an example environment that selects confident image samples, in accordance with various embodiments described herein.

FIG. 2 illustrates an example environment that determines and selects the confident image samples 114 from different "panda" images identified and accessed responsive to an image-based search query specifying "panda". As discussed with respect to FIG. 1, the images depicted in FIG. 2 are each initially identified via a textual association with the word "panda", and therefore, each image depicted in FIG. 2 may be included in the initial ranked set of M images 110. In FIG. 2, examples images 202 and 204 are determined to be the confident image samples 114 because they have a high degree of visual content similarity with respect to a mass of different panda images 206 in the initial ranked set of M images 110.

The visual features and/or patterns used to determine a degree of visual content similarity between two images may include, but is not limited to, features associated with color of the image, texture of the image, shape of the image, spatial distribution of the image, or the like. Several visual mechanisms that aid in extracting, deriving and comparing visual features and/or patterns of images include, for example: attention guided color signature, color spatialet, wavelet, scale-invariant feature transform (SIFT), multi-layer rotation invariant, histogram of gradient (HoG), facial feature, etc.

Accordingly, with respect to FIG. 2, the confident image samples 202 and 204 are selected as good representative images (e.g., the most likely to be relevant) of the mass of different panda images 206 by virtue of a high degree of visual content similarity between the confident image samples 202 and 204 and the mass of different panda images 206. Moreover, the degree of visual content similarity between confident image samples 202 and 204 and the mass of different panda images 206 is higher compared to a degree of content similarity between example image 208 and the mass of different panda images 206. As an example, the degree of visual content similarity may be higher for the confident image samples 202 and 204 because the images are actual photos of a panda bear each comprising visual features and/or patterns which are more prevalent in the mass of different panda images 206, while example image 208 depicts a black and white cartoon image of a panda bear with visual features and/or patterns that may not be as prevalent in the mass of different panda images 206. Similarly, the degree of visual content similarity for confident image samples 202 and 204 is most likely higher when compared to example image 210 because example image 210 is an image of a panda bear's paw and therefore, is lacking other visual features and/or patterns common to the mass of different panda images 206.

In FIG. 2, example images 212 and 214 may be photos of a small band called "The Pandas". Images 212 and 214 are outlier images that are not likely to be relevant to the user's image-based search query of "panda" because the user is more likely interested in receiving image results of a panda bear. In contrast, in an event the user is searching for a band called "panda" the user is more likely to search "panda band" or "panda music". However, outlier images 212 and 214 may be identified and accessed due to a high degree of textual matching between the sole query term "panda" and the textual information associated with each of outlier images 212 and 214.

As shown above, because the textual information associated with an image fails to capture the visual content of the image, it is common for search engines performing image-based searches to visually rerank the initial ranked set of M images 110. Common visual reranking approaches include explicit pseudo-relevance feedback (PRF) and implicit PRF.

Explicit PRF approaches include classification-based and clustering-based reranking mechanisms that use the consecutively listed top N images (e.g., 10, 20, 100 images) from the initial ranked set of M images 110 as pseudo-positive examples to train a classifier or derive clusters configured to score and rerank each image. However, the pseudo-positive examples used in the explicit PRF approaches are often unreliable because the top N images often include false-positive examples (e.g., outlier images 212 and 214) that are likely to be irrelevant to the search query. Since, explicit PRF approaches unknowingly consider and use visual features from outlier images when visually reranking images, the explicit PRF approaches are more susceptible to providing inaccurate relevance-based search results.

Implicit PRF approaches include graph-based and Bayesian visual reranking mechanisms that encourage relevant images at the bottom of the list to move up the list and be identified as pseudo-positive examples used for visual reranking. However, similar to the explicit PRF approaches, the implicit PRF approaches fail to remove highly ranked outlier images (e.g., images 212 and 214) that are irrelevant to a search query from consideration as pseudo-positive examples. Thus, both explicit PRF approaches and implicit PRF approaches are not implemented to avoid the use of highly ranked false-positive examples when visually reranking images. These false-positive examples hinder the quality of the visual reranking.

The techniques described herein avoid considering false-positive examples when visually reranking the initial ranked set of M images 110 because the techniques determine and select one or more confident image samples 114 from the initial ranked set of M images 110. As discussed herein, the techniques select the confident image samples 114 based on calculations and/or computations that determine a degree of visual content similarity between the confident samples and all the images in the initial ranked set of M images 110. Thus, the techniques identify and select reliable images that are likely relevant to the received image-based search query. The confident image samples 114 may be distributed amongst the initial ranked set of M images 110, and therefore, the confident image samples 114 do not have to be consecutively listed amongst the top N images within the initial ranked set of M images 110. Accordingly, the techniques discussed herein provide robustness against outlier images by eliminating the outlier images from consideration and not using the outlier images in the visual reranking process. This improves the visual reranking process and returns better and more accurate image-based search results.

Figure 3:
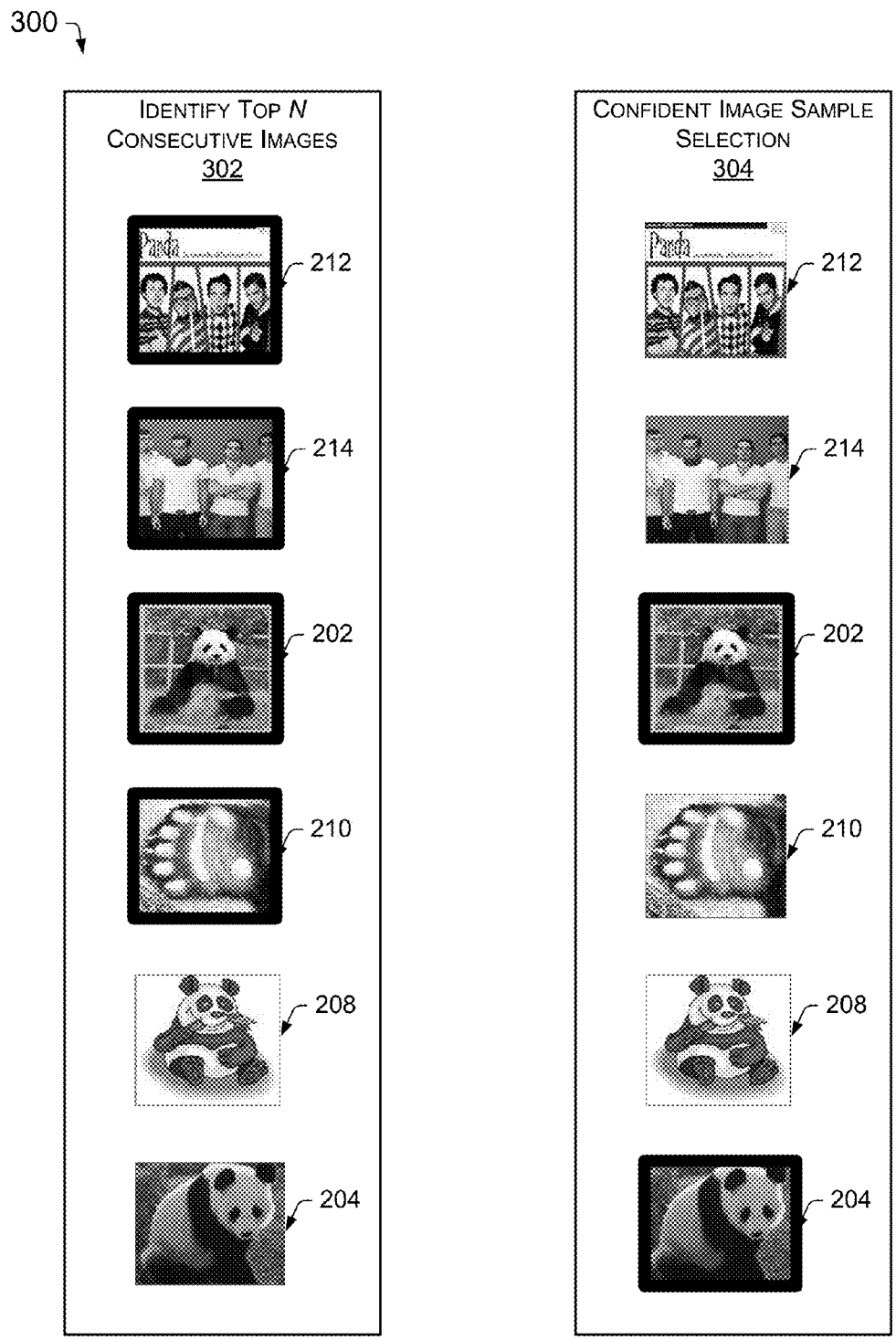
FIG. 3 illustrates an example environment that selects confident image samples, in accordance with various embodiments.

FIG. 3 illustrates an example comparison 300 of determining candidate images used to visually rerank the initial ranked set of M images. The order and selection of the bolded outlined images provided in 302 depict the identification of candidate images in explicit and implicit PRF approaches, as previously discussed. The order and selection of the bolded outlined images provided in 304 depict the detection and selection of confident image samples provided by the techniques discussed herein. As depicted in 302, each of the top N images are automatically selected as pseudo-positive images by virtue of their consecutively ordered top N positions in the initial ranked set of M images 110 (e.g., N is four in this example). However, the identification in 302 includes false-positive outlier images 212 and 214, which are not reliable images for visual reranking because they do not share a high degree of visual content similarity with the mass of different panda images 206. As previously discussed, outlier images 212 and 214 are included in the top N images by virtue of having a high degree of textual matching.

As depicted in 304, the techniques discussed herein select confident image samples 202 and 204 which may or may not be included in the top N images (e.g., N is four in this example). In other words, the techniques discussed herein relax the assumption in the explicit and implicit PRF approaches that all images in the top N are relevant to the search query. Instead, the confident image samples do not have to be consecutively positioned in the top N images. This allows the techniques to eliminate the consideration and use of false-positive examples and ensure that likely relevant images are used for visual reranking.

Accordingly, the techniques discussed herein automatically find confident image samples 114 using a novel sparsity and ranking constrained $l_1$ square loss optimization framework, which is further discussed herein. Moreover, this automatic process that determines and selects confident image samples for visual reranking is unsupervised (e.g., does not require human training, human selection, or human labeling).

Illustrative Architecture

Figure 4:
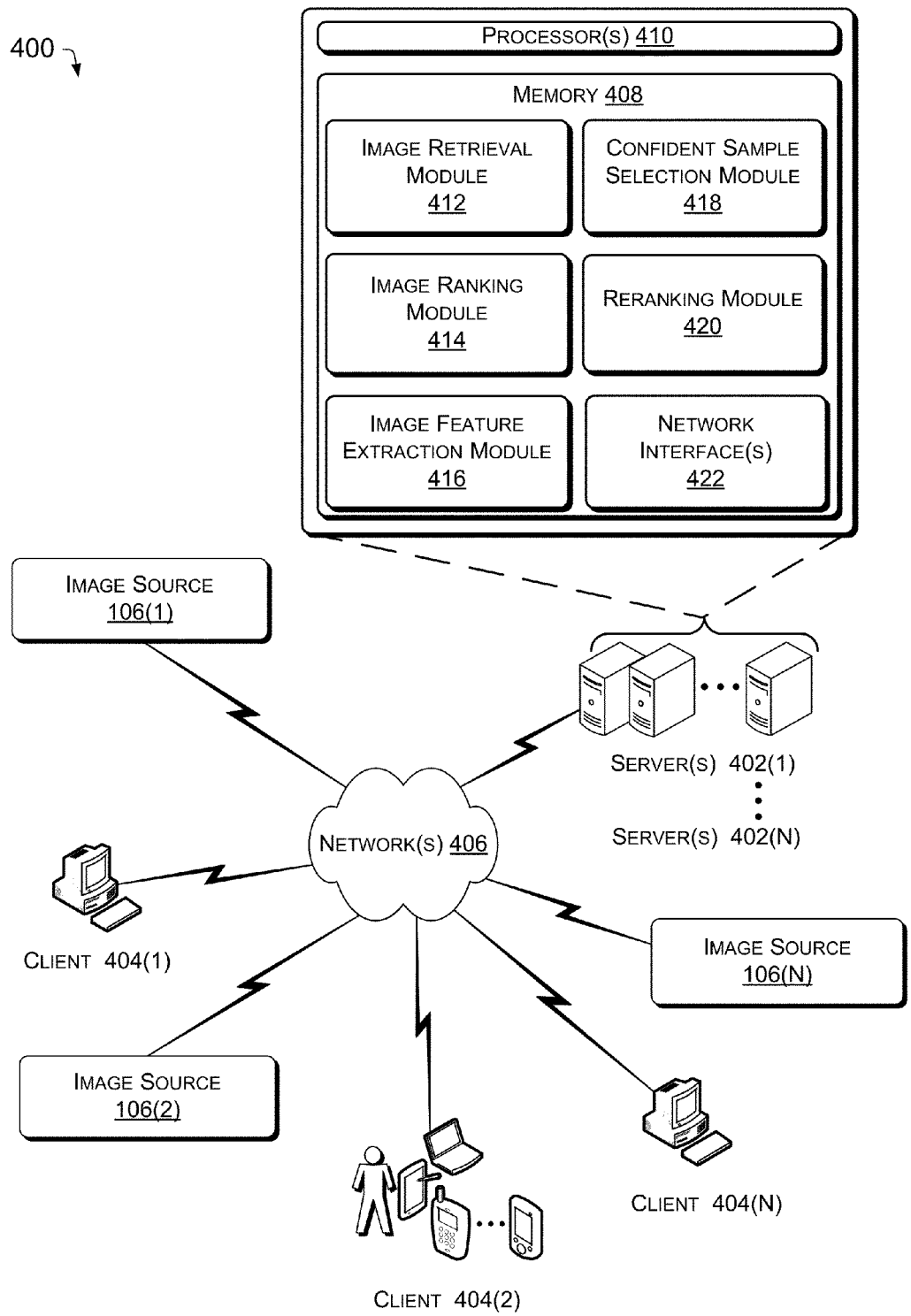
FIG. 4 illustrates an example architecture for implementing the described techniques, in accordance with various embodiments.

FIG. 4 shows an illustrative architecture 400 that may employ the described techniques. To this end, architecture 400 includes one or more server computing devices 402(1)...402(N), one or more client computing devices 404(1)...404(N), and one or more image sources 106(1)...106(N), each coupled to network(s) 406. In various embodiments, the server computing devices 402(1)...402(N) may host image-based search functionality, and thus, may be one or more web search engines such as Microsoft® Bing® search engine, Google® search engine, Yahoo® search engine, etc. In various embodiments, a user submits an image-based search query including one or more search terms via a web browser or other application at the one or more client computing devices 404(1)...404(N). The client computing devices 404(1)...404(N) may comprise one of an array of computing devices capable of connecting to the one or more network(s) 406, such as a server computer, a client computer, a personal computer, a laptop computer, a mobile phone, a personal digital assistant (PDA), tablets, gaming consoles, set top boxes, and the like. Moreover, a user-submitted search query includes one or more words, terms, characters, numbers, symbols, and/or text strings entered, for example, via a graphical user interface (GUI), with the user intent of finding and receiving a desired image or a set of desired image relevant to the search query.

In various embodiments, the architecture 400 can be the World Wide Web, including numerous PCs, servers, and other computing devices spread throughout the world. The server computing devices 402(1)...402(N), the client computing devices 404(1)...404(N), and the image sources 106(1)...106(N) may be coupled to each other in various combinations through a wired and/or wireless network 406, including a LAN, WAN, or any other networking and/or communication technology known in the art. It is understood in the context of this document, that image sources 106(1)...106(N) may include, but are not limited to, any entity configured to store and maintain image content that a search engine may search in response to receiving a query. For example, image sources 106(1)...106(N) may be web servers, file transfer servers, image databases, social media servers, photo repositories, etc.

Furthermore, the server computing devices 402(1)...402(N) comprise a memory 408 and one or more processors 410. In various embodiments, the server computing devices 402(1)...402(N) include an image retrieval module 412, an image ranking module 414, an image feature extraction module 416, a confident sample selection module 418, a reranking module 420, and one or more network interface(s) 422, each of which are further discussed herein.

The processor(s) 410 may be a single processing unit or a number of units, all of which could include multiple computing units. The processor(s) 410 may be implemented as one or more microprocessors, microcomputers, microcontrollers, digital signal processors, central processing units, state machines, logic circuitries, and/or any devices that manipulate signals based on operational instructions. Among other capabilities, the processor(s) 410 may be configured to fetch and execute computer-readable instructions stored in the memory 408.

The memory 408 may comprise computer-readable media including, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing or server device.

In contrast, communication media may embody computer readable instructions, data structures, program modules, or other data in a modulated data signal, such as a carrier wave, or other transmission mechanism. As defined herein, computer storage media does not include communication media.

The network interface(s) 422 enable network communication, and may include one or more ports for connecting the respective computing device to the network 406. The network interface(s) 422 can facilitate communications within a wide variety of networks and protocol types, including wired networks (e.g. LAN, cable, etc.) and wireless networks (e.g., WLAN, cellular, satellite, etc.). For instance, the network interface(s) may access, over network(s) 406, image data located at the image sources 106(1)...106(N). In various embodiments, server computing device(s) 402(1)...402(N) may have local access to one or more image sources 106(1)...106(N. Moreover, in various embodiments the modules stored in memory 408 may be coupled to, have direct access to, or have network access to one or more image sources 106(1)...106(N.

It is understood in the context of this document, that the functionality performed by the image retrieval module 412, the image ranking module 414, the image feature extraction module 416, the confident sample selection module 418, and the reranking module 420 may be all inclusive on a single server computing device 402(1) implementing image-based searches responsive to receiving a search query, or spread amongst a plurality of server computing device(s) 402(1) ... 402(N) connected to one another via network(s) 406. For instance, in one example functionality performed by the image retrieval module 412 may be spread across multiple server computing devices. In another example, functionality performed by the image retrieval module 412 may be entirely on a first server computing device, while functionality performed by the confident sample selection module 418 may be on a different server computing device.

As previously discussed with respect to FIG. 1, the image retrieval module 412 identifies and accesses a set of M images from one or more image sources 106(1) ... 106(N) in response to receiving a search query with one or more query terms. Once the set of M images is identified, the image ranking module 414 initially ranks the set of M images according to relevance scores based on textual matching. For instance, the image ranking module 414 compares the query terms with textual elements (e.g., image titles, image captions, URLs, etc.) associated with a stored image.

The image feature extraction module 416 is configured to extract visual content features from the initial ranked set of M images identified. As discussed herein, the initial ranked set of M images is defined as follows, $$\bar{r}=[\bar{r}_1,r_2,\ldots,r_M]\in\mathbb{R}^M, \quad (1)$$

$$X=[x_1,x_2,\ldots,x_M]. \quad (2)$$

Thus, $\bar{r}$ in equation (1) is the initial ranked set of M images accessed and identified responsive to a search query, and equation (2) is a corresponding set of visual content features extracted by the image feature extraction module 416 for each of the respective images in $\bar{r}$. The confident sample selection module 418 then detects confident image samples as further discussed herein. Once the confident sample selection module 418 determines and selects the confident image samples, the reranking module 420 returns another ranked list defined as follows, $$r=f(X;\bar{r}). \quad (3)$$

Here, f returns the ranked list $r=[r_1, r_2, \ldots, r_M]\in\mathbb{R}^M$, which is considered a refined version of $\bar{r}$ that considers visual content features apparent in the initial ranked set of M images.

To find confident image samples from the initial ranked set of M images, the confident sample selection module 418 defines a function as follows, $$c=g(X;\bar{r}). \quad (4)$$

Here, c is a binary vector comprising individual labels $c_i$ for each image $I_i$ in the initial ranked set of M images. When $c_i$ is determined to be one for image $I_i$, then the image $I_i$ is a confident sample used for reranking the initial ranked set of M images. When $c_i$ is determined to be zero for image $I_i$, then the image $I_i$ is not a confident sample used for reranking the initial ranked set of M images.

Confident sample detection is based on the observation that images that are more likely to be relevant to a search query will share visual features and/or patterns with one another more often than with outlier images that are most likely irrelevant to the search query. Thus, for each image $I_i$ in the initial ranked set of M images 110, the confident sample selection module 418 determines a total similarity degree to all other images in the ranked set by computing a kernel matrix $K\in\mathbb{R}^{M\times M}$. Each entry, $K_{ij}$, in K stores the similarity between visual features $x_i$ and $x_j$ for two respective images $I_i$ and $I_j$. For instance, if the initial ranked set of M images 110 includes eight images (eight being a small number used for understanding the techniques), then the confident sample selection module 418 computes an eight by eight matrix K. Accordingly, each row in K includes a plurality of similarity elements determined for a single image $I_i$ when respectively compared with all other images, $I_j$, in the initial ranked set of M images.

In various embodiments, the confident sample selection module 418 obtains the kernel matrix K by computing a cosine similarity between the different visual features ($x_i$ and $x_j$) compared as follows, $K=X^T X-I$. Moreover, all self-similarity elements in K are set to zero (e.g., elements in each row where an image $I_i$ is compared with itself).

Next, the confident sample selection module 418 sums, for each image $I_i$, the similarity elements (e.g., entries) in each row of K to determine the total similarity degree $s_i$ of the image $I_i$ to all other images in the initial ranked set of M images. This results in a column vector, $s=Ke$, that includes each respective total similarity degree entry $s_i$ for all the images the images in the initial ranked set of M images, where e is a vector of all ones.

The confident sample selection module 418 then determines which images are the main contributors to the composition of the column vector s. The images that are the main contributors to the composition of the column vector s are most likely significantly similar to other relevant images in the initial ranked set of M images, and therefore the main contributors are good candidate images for selection as confident image samples.

In order to determine the main contributing images, the confident sample selection module 418 implements a reconstruction-based approach which attempts to minimize an error between s and Kc, which will allow the confident sample selection module 418 to select samples with high confidence. Accordingly, the confident sample selection module 418 adds a sparsity constraint on c as follows, $$\min_c \|s-Kc\|_q^p+\alpha\phi(\bar{r},c), s.t. \; c\in\{0,1\}^M. \quad (5)$$

Here, $\alpha$ is a trade-off parameter that balances the two terms separated by the addition symbol, and $\phi(x)$ takes $\bar{r}$ as one of the inputs so that the confident sample selection module 418 considers selecting confident samples based on preferences associated with a position within the initial ranked set of M images determined based on textual matching, in addition to considering a degree of visual content similarity. Moreover, the variables p and q define the norm for the left term of equation (5). In various embodiments, p=2 and q=1. When p=2 and q=1, the norm is associated with a $l_1$ square loss optimization framework, which is robust against outlier images and noisy data, as further discussed herein.

While equation (5) provides a robust solution that results in a small number of non-zero entries for c and achieves a low reconstruction error, equation (5) is a binary integer programming problem that is generally non-deterministic polynomial-time hard (NP-hard). Thus, the confident sample selection module 418 introduces two relaxation schemes so that equation (5) can be solved efficiently and effectively within image-based search functionality.

The first relaxation scheme is a non-negative least squares scheme. The non-negative least squares scheme is a sparsity and ranking constrained $l_1$ square loss optimization framework. This first relaxation scheme allows the confident sample selection module 418 to solve equation (5) in a short period of time, which in return allows a search engine to provide faster image-based search results. The confident sample selection module 418 introduces an auxiliary non-negative real vector $z\in\mathbb{R}_{+,0}^M$ that infers c as follows, $$C=1_{(z>0)}. \quad (6)$$

Here, $1_{(x)}$ is an element-wise indicator function returning one if $z_i$ is positive, and zero otherwise. The confident sample selection module 418 replaces c in equation (5) with z, to obtain a minimization problem as follows, $$\min_z \|s-Kc\|_1^2 + \alpha\phi\|Dz\|_1^2, \text{ s.t. } z>0. \quad (7)$$

The confident sample selection module 418 adopts the $l_1$ square loss to measure a reconstruction error between s and Kz because the $l_1$ square loss tolerates (e.g., avoids considering) outlier images which do not share visual content similarity with other images, compared to $l_2$ square loss which is sensitive to outlier images. Furthermore, the $l_1$ norm (e.g., p=2 and q=1) provides a sparsity constraint on z, and the confident sample selection module 418 introduces a diagonal matrix D that includes the initial ranking of the M images (e.g., based on the textual matching). Each diagonal entry of D acts as a weight for the corresponding entry in c. The lower the weight, the higher the chance of the corresponding entry of c being non-zero (e.g., indicating the corresponding image is a confident sample). Accordingly, the confident sample selection module 418 introduces D to bias the preference of choosing confident samples that are originally positioned higher in the initial ranked set of M images.

In various embodiments, the confident sample selection module 418 introduces another constraint, s−Kz≥0, to avoid over-reconstruction of s by Kz where some entries of s−Kz may be negative (e.g., confident sample images found to be relevant that are not truly relevant). Accordingly, the confident sample selection module 418 may further define equation (7) as follows, $$\min_z \left\| \begin{bmatrix} e^T s \\ 0 \end{bmatrix} - \begin{bmatrix} e^T K \\ \sqrt{\alpha} e^T D \end{bmatrix} z \right\|_2^2, \quad (8)$$

s.t. $z \geq 0$, s.t. $s - Kz \geq 0$.

Equation (8) is a quadratic programming problem that the confident sample selection module 418 can solve in polynomial time (e.g., via a standard quadratic programming solver or the like). The confident sample selection module 418 then selects the images corresponding to the non-zero entries of the optimal z as the confident image samples 114, as discussed above with respect to FIG. 1 and FIG. 2.

The second relaxation scheme is a bounded-variable least squares scheme that builds upon equation (8). Thus, the bounded-variable least squares scheme is also associated with a sparsity and ranking constrained $l_1$ square loss optimization framework, and also allows the confident sample selection module 418 to solve equation (5) in a short period of time, which in return allows a search engine to provide faster image-based search results. For the bounded-variable least squares scheme, the confident sample selection module 418 introduces both a lower and upper bound for z such that entries will be between zero and one. The lower and upper bounds provide that s−Kz≥0, and further define equation (8) as follows, $$\min_z \left\| \begin{bmatrix} e^T s \\ 0 \end{bmatrix} - \begin{bmatrix} e^T K \\ \sqrt{\alpha} e^T D \end{bmatrix} z \right\|_2^2, \quad (9)$$

s.t. $0 \leq z \leq 1$.

In various embodiments, equation (9) improves the ability of the confident sample selection module 418 to fit the reconstruction of relevant images while excluding outlier images (e.g., irrelevant images) using the $l_1$ loss. Thus, the bounded-variable lease squares scheme further reduces the possibility of selecting false-positive example images as confident samples. The confident sample selection module 418 then selects the images corresponding to the non-zero entries of the optimal z as the confident image samples 114, as discussed above with respect to FIG. 1 and FIG. 2.

Accordingly, both the non-negative least squares relaxation scheme and the bounded-variable least squares relaxation scheme provide sparsity and ranking constraints on z. The sparsity constraint allows the confident sample selection module 418 to discover a small number of relevant images, while the ranking constraint utilizes the initial ranking, $\bar{r}$, as an additional constraint on z such that images that are originally positioned high in the initial ranked set of M images have a preference or greater probability of being confident image samples.

As previously discussed, the confident sample selection module 418 introduces a matrix D, and combines D with z in the $l_1$ norm to achieve this preference. For instance, in various embodiments the confident sample selection module 418 introduces a linear approach to set each diagonal entry $D_{ii}$ in D. The linear approach is defined as follows, $$D_{ii} = \eta(i+v). \quad (10)$$

Here, $\eta$ is a scaling constant for used for normalization so that the diagonal entries of D sum to one, i is the initial rank, and v is an offset constant used on the initial rank.

In various embodiments, the confident sample selection module 418 introduces a step-wise approach to set each diagonal entry $D_{ii}$ in D. The step-wise approach is defined as follows, $$D_{ii} = \eta[(i+v)/\epsilon]. \quad (11)$$

Here, $\eta$ is a scaling constant for used for normalization, i is the initial rank, v is an offset constant used on the initial rank, and $\epsilon$ is a dividing constant used to achieve the step-wise effect.

In various embodiments, the confident sample selection module 418 introduces a shrinkage approach to set each diagonal entry $D_{ii}$ in D. The shrinkage approach is defined as follows, $$D_{ii} = \eta(\max(i-\epsilon, 1)+v)). \quad (12)$$

Here, $\eta$ is a scaling constant for used for normalization, i is the initial rank, v is an offset constant used on the initial rank, and $\epsilon$ is a threshold constant used to suppress a value to zero via the max function.

As previously discussed, two relevant images are more likely to be visually similar to one another compared to a relevant image and an irrelevant image. Accordingly, once the confident sample selection module 418 selects a small number of confident image samples, the reranking module 420 uses the detected confident image samples as reference points to rerank the initial ranked set of M images according to a function that determines similarities between the confident image samples and the rest of the M images, the function defined as follows, $$r = h(X, c). \quad (13)$$

Thus, the reranking module 420 computes a visual reranking score for each image in the initial ranked set of M images, and reranks the M images according to the visual reranking score. In various embodiments, the reranking module 420 computes a visual reranking score for each image as follows, $$r_i = \sum_{m=1}^{M} 1_{(z_m>0)} \exp\left(\frac{\|x_i - x_m\|^2}{2h^2}\right). \quad (14)$$

Equation (14) reranks each image as the summation of Gaussian kernels with the confident image samples.

In other embodiments, the reranking module 420 does not use Gaussian kernels, and thus, equation (14) may be generalized as follows, $$r_i = \Sigma_{m=1}^{M} 1_{(z_m>0)} K(x_i, x_m). \quad (15)$$

The reranking module 420 may rerank the images according to equation (15) when the available information is limited to the kernel matrix K previously discussed. Thus, in various embodiments, confident image sample detection and the image reranking process may directly work in correspondence with a kernel matrix. Accordingly, the reranking process may be referred to as an adapted kernel-based reranking process.

Illustrative Processes

Figure 5:
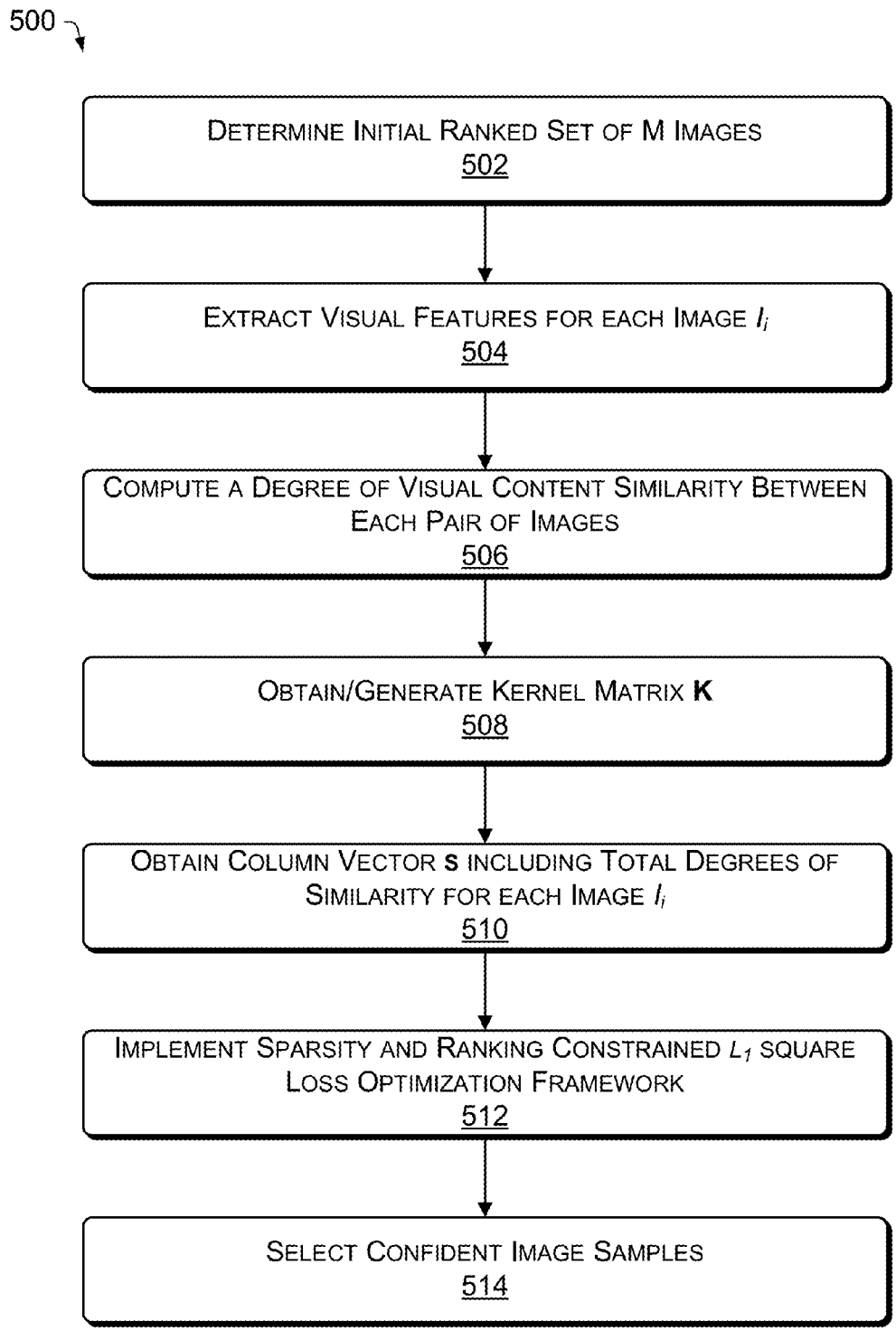
FIG. 5 illustrates an example process that selects confident image samples, in accordance with various embodiments.
Figure 6:
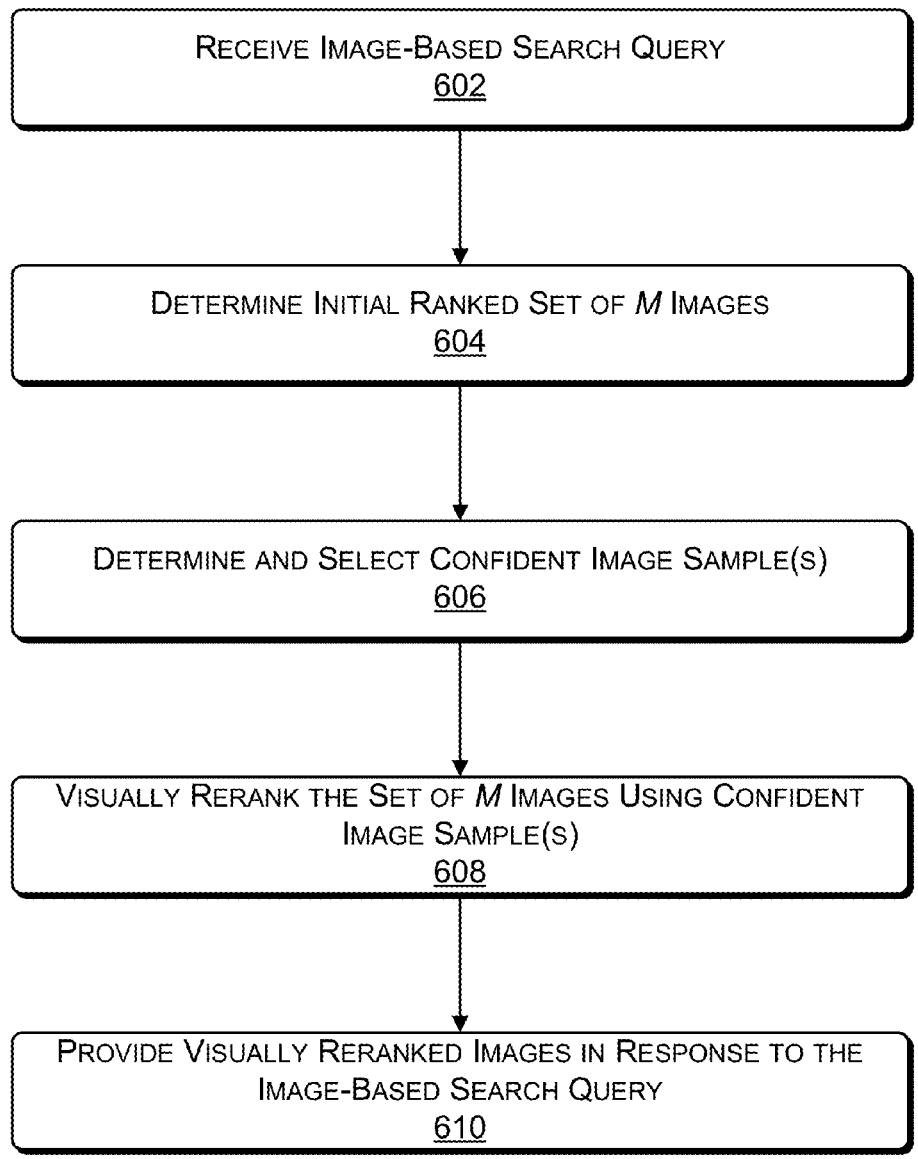
FIG. 6 illustrates an example process that uses the selected confident image samples to provide image-bases search results, in accordance with various embodiments.

Example operations are described herein with reference to FIG. 5 and FIG. 6. The processes are illustrated as logical flow graphs, which represent a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 illustrates an example process 500 that detects and selects the confident image samples. At operation 502, the image retrieval module 412 and image ranking module 414 determine an initial ranked set of M images by matching query terms with textual information associated with the respective images.

At operation 504, the image feature extraction module 416 extracts individual visual content features and/or patterns form each image $I_i$ in the initial ranked set of M images.

At operation 506, the confident sample selection module 418 uses the individual visual content features and/or patterns extracted to compute a degree of visual content similarity between each pair of images in the in the initial ranked set of M images.

At operation 508, the confident sample selection module 418 obtains or generates a kernel matrix K using the individual respective degrees of visual content similarities computed for each pair of images. As previously discussed, each row in K includes a plurality of similarity elements determined for a single image $I_i$ when respectively compared with all other images, $I_j$, in the initial ranked set of M images.

At operation 510, the confident sample selection module 418 obtains a column vector s which includes each image's total degree of similarity to all other images. As previously discussed, in order to obtain the total degree of similarity for each image, the confident sample selection module 418 sums, for each image $I_i$, the similarity elements in each row of K.

At operation 512, the confident sample selection module 418 implements a sparsity and ranking constrained $l_1$ square loss optimization framework using K and s as discussed above with respect to equation (5). In various embodiments, the confident sample selection module 418 uses a non-negative least squares relaxation scheme as discussed above with respect to equations (6), (7), and (8). In various embodiments, the confident sample selection module 418 uses a bounded-variable least squares relaxation scheme as discussed above with respect to equations (6), (7), (8), and (9).

At operation 514, the confident sample selection module 418 selects confident images samples based on the outcome of implementing operation 512.

FIG. 6 illustrates an example process 600 that provides image-based search results visually reranked using the confident image samples determined in FIG. 5. At operation 602, a search engine receives an image-based search query.

At operation 604, the image retrieval module 412 and image ranking module 414 determine an initial ranked set of M images by matching query terms with textual information associated with the respective images.

At operation 606, the confident sample selection module 418 determines and selects one or more confident image samples in accordance with the example process in FIG. 5.

At operation 608, the reranking module 420 visually reranks the initial ranked set of M images using the confident image samples. In various embodiments, the reranking module 420 uses equation (14) to visually rerank each image as the summation of Gaussian kernels with the confident image samples. In various embodiments, the reranking module 420 uses the adapted kernel-based reranking process associated with equation (15). The visual reranking operation 608 promotes the relevant images in the initial ranked set of M images while demoting the irrelevant or outlier images.

At operation 610, the search engine provides the visually reranked images in response to the image-based search query. In various embodiments, the search engine may provide a portion, or a subset, of the visually reranked images (e.g., the top fifty images).

CONCLUSION

Although the subject matter has been described in language specific to structural features and/or methodological acts, it is to be understood that the subject matter defined in the appended claims is not necessarily limited to the specific features or operations described above. Rather, the specific features and operations described above are described as examples for implementing the claims.

The invention claimed is:

1. A method comprising:
receiving a search query;
ranking, based at least in part on the search query, a set of images to provide a set of ranked images;
extracting visual features for individual images of the set of ranked images;
determining, by one or more processors and based at least in part on the extracted visual features, a first degree of visual content similarity for individual images of the set of ranked images with respect to one or more other images of the set of ranked images;
implementing, by the one or more processors, a selection algorithm to automatically select at least two confident image samples from the set of ranked images based at least in part on the first degrees of visual content similarity and based at least in part on ranking positions of individual images within the set of ranked images, wherein the at least two confident image samples automatically selected are not consecutively ordered within the set of ranked images;

determining, by the one or more processors and based at least in part on the extracted visual features, a second degree of visual content similarity for individual images of the set of ranked images with respect to the at least two confident image samples; and reranking the set of ranked images based at least in part on the second degrees of visual content similarity.

2. The method as recited in claim 1, further comprising providing at least a portion of the set of reranked images as search results in response to receiving the search query.

3. The method as recited in claim 1, wherein reranking the set of ranked images comprises promoting images that are visually similar to the at least two confident image samples and demoting images that are not visually similar to the at least two confident image samples.

4. The method as recited in claim 1, wherein the first degree of visual content similarity for a given image is determined based on comparing the extracted visual features associated with the given image to the extracted visual features associated with the one or more other images of the set of ranked images.

5. The method as recited in claim 1, further comprising implementing a non-negative least squares relaxation algorithm to automatically select the at least two confident image samples from the set of ranked images.

6. The method as recited in claim 1, further comprising implementing a bounded-variable least squares relaxation algorithm to automatically select the at least two confident image samples from the set of ranked images.

7. The method as recited in claim 1, further comprising implementing an adapted kernel-based reranking process to rerank the set of ranked images based at least in part on the second degrees of visual content similarity.

8. The method as recited in claim 1, wherein the set of ranked images associated with the search query is determined based at least in part on matching query terms with textual information corresponding to individual images of the set of ranked images.

9. A system comprising:
one or more processors;
a memory, coupled to the one or more processors, storing:
an image ranking module, operable by the one or more processors, that ranks images associated with a search query based at least in part on textual matching, thereby providing a set of ranked images;
an image feature extraction module, operable by the one or more processors, that extracts visual features from individual ones of the set of ranked images;
a confident sample selection module, operable by the one or more processors, that determines, based at least in part on the extracted visual features, a first degree of visual content similarity for individual ones of the set of ranked images with respect to one or more other images of the set of ranked images and that implements a selection algorithm to automatically select at least two non-consecutively ordered confident image samples based at least in part on the first degrees of visual content similarity and based at least in part on ranking positions of individual images within the set of ranked images; and
a reranking module, operable by the one or more processors, that determines, based at least in part on the extracted visual features, a second degree of visual content similarity for individual ones of the set of ranked images with respect to the at least two non-consecutively ordered confident image samples and that reranks the set of ranked images based at least in part on the second degrees of visual content similarity.

10. The system as recited in claim 9, wherein the first degree of visual content similarity for a given image is determined based on comparing the extracted visual features associated with the given image to the extracted visual features associated with the one or more other images of the set of ranked images.

11. The system as recited in claim 9, wherein the confident sample selection module implements a non-negative least squares relaxation algorithm to automatically select the at least two non-consecutively ordered confident image samples from the set of ranked images.

12. The system as recited in claim 9, wherein the confident sample selection module implements a bounded-variable least squares relaxation algorithm to automatically select the at least two non-consecutively ordered confident image samples from the set of ranked images.

13. The system as recited in claim 9, wherein the reranking module implements an adapted kernel-based reranking process to rerank the set of ranked images based at least in part on the second degrees of visual content similarity.

14. The system as recited in claim 9, wherein the at least two non-consecutively ordered confident image samples automatically selected are not consecutively ordered highest ranked images within the set of ranked images.

15. One or more computer storage media comprising instructions that, when executed, configure a computer device to perform operations comprising:
receiving a search query;
ranking a set of images based at least in part on terms used in the search query;
extracting visual features for individual images of the set of ranked images;
determining, based at least in part on the extracted visual features, a first degree of visual content similarity for individual images of the set of ranked images with respect to one or more other images of the set of ranked images;
implementing a selection algorithm to automatically select at least two non-consecutively ordered confident image samples from the set of ranked images based at least in part on the first degrees of visual content similarity and based at least in part on ranking positions of individual images within the set of ranked images;
determining, based at least in part on the extracted visual features, a second degree of visual content similarity for individual images of the set of ranked images with respect to the at least two non-consecutively ordered confident image samples;
reranking the set of ranked images based at least in part on the second degrees of visual content similarity; and
providing at least a portion of the reranked set of images as search results.

16. The one or more computer storage media recited in claim 15, wherein reranking the set of ranked images comprises promoting images that are visually similar to the at least two non-consecutively ordered confident image samples and demoting images that are not visually similar to the at least two non-consecutively ordered confident image samples.

17. The one or more computer storage media recited in claim 15, further comprising instructions that, when executed, configure the computing device to implement a non-negative least squares relaxation algorithm to automatically select the at least two non-consecutively ordered confident image samples from the set of ranked images.

18. The one or more computer storage media recited in claim 15, further comprising instructions that, when executed, configure the computing device to implement a bounded-variable least squares relaxation algorithm to automatically select the at least two non-consecutively ordered confident image samples from the set of ranked images.

19. The one or more computer storage media recited in claim 15, further comprising instructions that, when executed, configure the computing device to implement an adapted kernel-based reranking process to rerank the set of ranked images based at least in part on the second degrees of visual content similarity.

20. The one or more computer storage media recited in claim 15, wherein the at least two non-consecutively ordered confident image samples automatically selected are not consecutively ordered highest ranked images within the set of ranked images.

* * * * *